Oct. 26, 1926.　　　　　　　　　　　　　　　1,604,917
G. W. KING
MILK PAIL HOLDER
Filed May 11, 1926
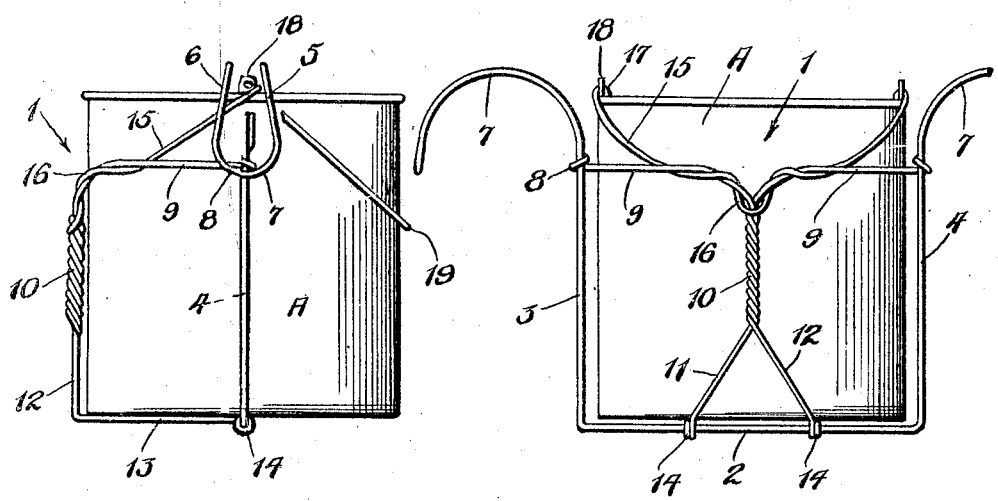
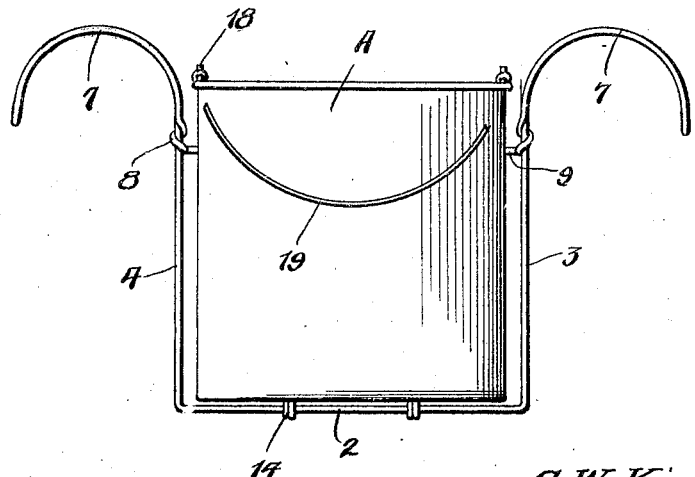
Inventor
G. W. King.
By Clarence A. O'Brien
Attorney Patented Oct. 26, 1926.

1,604,917

UNITED STATES PATENT OFFICE.

GEORGE W. KING, OF PLUM CITY, WISCONSIN.

MILK-PAIL HOLDER.

Application filed May 11, 1926. Serial No. 108,400.

The present invention relates to improvements in milk pail holders, and has for its principal object to provide a device which will permit a person milking a cow to support a milk pail between the legs while in a seated position.

One of the important objects of the present invention is to provide a milk pail holder wherein means is provided for preventing the accidental displacement of the milk pail from the holder, said means further tending to prevent the knees of the milker pushing in the sides of the pail.

A further object of the invention is to provide a milk pail holder which is formed from a single strand of wire, the same being so bent as to provide a support for the milk pail and also including a pair of leg engaging clamp members.

A further object is to provide a milk pail holder of the above mentioned character which is simple in construction, inexpensive, strong and durable and further well adapted to the purpose for which it is designed.

Other objects and advantages of the invention will become apparent from the following description taken in connection with the accompanying drawing.

In the accompanying drawing forming a part of this application and in which like numerals designate like parts throughout the several views:

Figure 1 is a side elevation of the milk pail holder embodying my invention showing a milk pail in position in the holder, a portion of the arms and the bail being broken away to illustrate the manner in which the hook engages the ear on the pail.

Figure 2 is a rear elevation, and

Figure 3 is a front elevation.

In the drawing wherein for the purpose of illustration is shown the preferred embodiment of my invention, the numeral 1 designates generally my improved milk pail holder, the same being formed from a single strand of wire. The intermediate portion of the wire is designated by the numeral 2, and the bottom of the milk pail A is disposed above the intermediate portion 2, and between the side forming portions 3 and 4 of the wire which side portions extend upwardly from the intermediate portion 2 in the manner clearly shown in Figures 2 and 3.

The upper portions of the sides 3 and 4 are bent back upon themselves as shown more clearly in Figure 1 to provide the spaced arms 5 and 6 and each of the arms associated with the respective side forming portions 3 and 4 are curved outwardly to provide the leg engaging hooks 7, these hooks 7 are preferably arranged at a point adjacent the top of the pail A at diametrically opposite points.

The end portions of the wire are twisted around the upper portions of the side forming portions 3 and 4, as illustrated at 8 and then the end portions are disposed laterally as illustrated at 9. The laterally disposed portions are curved inwardly toward each other so as to conform to the shape of the milk pail A and are then disposed downwardly, the downwardly disposed portions of the ends being twisted as illustrated at 10 and the free ends 11 and 12 extend downwardly from the twisted portion 10 in diverging relation to a point substantially in the same plane as the intermediate portion 2. The free end portions are then disposed laterally in an inward direction as at 13, and the free ends are coiled or twisted about the intermediate portion 2 of the wire as at 14. In this manner, a stand or holder is provided for the milk pail which is open at one side to facilitate the insertion of the pail in the holder, and the bottom of the pail will rest on the inwardly disposed portions 13 as is clearly illustrated in the several figures of the drawing.

For the purpose of retaining the milk pail A in position in the holder and for further preventing the knees of the person holding the pail between his legs pushing inwardly on the opposite sides of the top portion of the pail, there is provided a single strand of wire 15, the intermediate portion of which is bent around the converging portions of the laterally extending portions 9 as illustrated at 16, the free ends of the wire 15 extending upwardly and being curved so as to conform to the shape of the upper portion of the pail A, the free ends of the wire 15 being bent to provide suitable hooks 17 which engage over the usual ears 18 which extend upwardly from the upper edge of the pail A at diametrically opposite points and to which is secured the usual bail 19. The manner in which the hooked ends 17 of the wire 15 engage over the ears 18 is clearly shown in Figures 1 and 3 of the drawings, and these hooks are so constructed as to permit the same to be readily attached over the ears or detached from engagement therewith without any difficulty.

With the milk pail A supported in position in the holder 1 in the manner shown in the drawing, the holder and the pail is placed between the legs of the milker. The hook forming portions 7 extend over the leg portions of the milker and the open side of the holder faces the milker.

A milk pail holder of the above mentioned character will enable the milker to properly support a pail between the legs while milking a cow, and the holder will not cause any discomfort to the milker while the latter is in a seated position.

By constructing the holder from wire, the same is rendered very inexpensive and light in weight. Furthermore, the milk pail retaining member which is associated with the holder may be readily and easily engaged or disengaged from the pail.

While I have shown the preferred embodiment of my invention, it is to be understood that minor changes may be made in the invention without departing from the spirit of the invention, and the scope of the appended claims.

Having thus described the invention, what I claim as new and desire to secure by Letters Patent is:—

1. In a milk pail holder, a pail supporting frame formed from a single strand of wire, the same including an intermediate base portion, and upstanding side portions, said side portions terminating in leg engaging hooks, the end portions of the wire being twisted about the respective side portions and then disposed laterally, said end portions then being twisted together and disposed downwardly, the free end portions of the wire being disposed in diverging relation from said twisted portion and thence being disposed inwardly and secured to the intermediate portion to provide a base on which the bottom of the milk pail is adapted to rest.

2. In a milk pail holder, a pail supporting frame formed from a single strand of wire, the same including an intermediate base portion, and upstanding side portions, said side portions terminating in leg engaging hooks, the end portions of the wire being twisted about the respective side portions and then disposed laterally, said end portions then being twisted together and disposed downwardly, the free end portions of the wire being disposed in diverging relation from said twisted portion and thence being disposed inwardly and secured to the intermediate portion to provide a base on which the bottom of the milk pail is adapted to rest, and means associated with said frame for retaining the milk pail therein.

3. In a milk pail holder wherein the milk pail is provided with the usual upstanding bail attaching ears which extend above the upper edge portion of the pail at diametrically opposite points, a pail supporting frame formed from a single strand of wire, the same including an intermediate base portion, and upstanding side portions, said side portions terminating in leg engaging hooks, the end portions of the wire being twisted about the respective side portions and then disposed laterally, said end portions then being twisted together and disposed downwardly, the free end portions of the wire being disposed in diverging relation from said twisted portion and thence being disposed inwardly and secured to the intermediate portion to provide a base on which the bottom of the milk pail is adapted to rest, and means associated with said frame for retaining the milk pail therein, said means comprising an additional single strand of wire which has its intermediate portion bent around the converging portions of the aforementioned laterally disposed portions, the free ends of the last mentioned strand of wire being curved upwardly and terminating in hooks adapted for engagement over the respective ears on said pail.

In testimony whereof I affix my signature.

GEORGE W. KING.